(12) United States Patent
Zhou

(10) Patent No.: US 8,915,192 B2
(45) Date of Patent: Dec. 23, 2014

(54) CIRCULATED PNEUMATIC TUBE TRANSIT SYSTEM

(71) Applicant: Bo Zhou, Columbia, MO (US)

(72) Inventor: Bo Zhou, Columbia, MO (US)

(*) Notice: Subject to any disclaimer, the term of this patent is extended or adjusted under 35 U.S.C. 154(b) by 0 days.

(21) Appl. No.: 13/968,063

(22) Filed: Aug. 15, 2013

(65) Prior Publication Data

US 2014/0338557 A1 Nov. 20, 2014

Related U.S. Application Data

(60) Provisional application No. 61/283,195, filed on May 14, 2013.

(51) Int. Cl.
*B61B 13/10* (2006.01)
*B61B 13/08* (2006.01)

(52) U.S. Cl.
CPC ............... *B61B 13/10* (2013.01); *B61B 13/08* (2013.01)
USPC ..................................... 104/138.1; 104/138.2

(58) Field of Classification Search
USPC .......... 104/138.1, 138.2, 287, 154, 155, 156; 414/236, 237, 331.04
See application file for complete search history.

(56) References Cited

U.S. PATENT DOCUMENTS

| | | | |
|---|---|---|---|
| 624,202 A | 5/1899 | Fordyce | |
| 3,881,425 A * | 5/1975 | Carstens | 104/138.1 |
| 3,980,024 A * | 9/1976 | Futer | 406/93 |
| 3,999,487 A * | 12/1976 | Valverde | 104/138.1 |
| 4,017,039 A * | 4/1977 | Carstens | 406/105 |
| 4,023,500 A * | 5/1977 | Diggs | 104/138.1 |
| 4,646,787 A * | 3/1987 | Rush et al. | 138/98 |
| 5,253,590 A * | 10/1993 | Marusak | 104/138.1 |
| 5,950,543 A * | 9/1999 | Oster | 104/138.1 |
| 6,279,485 B1 * | 8/2001 | Schlienger | 104/156 |
| 6,499,409 B1 * | 12/2002 | Niederer et al. | 104/138.1 |
| 2009/0101040 A1 * | 4/2009 | Yang | 104/138.1 |
| 2010/0083864 A1 * | 4/2010 | Flynn | 104/138.1 |
| 2011/0283914 A1 * | 11/2011 | Kwon et al. | 104/138.1 |
| 2013/0025493 A1 * | 1/2013 | Friedmann | 104/138.1 |
| 2014/0000473 A1 * | 1/2014 | Miller | 104/138.1 |

FOREIGN PATENT DOCUMENTS

WO WO/2012/079114 6/2012

* cited by examiner

*Primary Examiner* — Jason C Smith

(57) ABSTRACT

A circulated pneumatic tube transit system is used to transport passengers/cargo along a pair of pneumatic tubes, which are positioned along each other. Capsules are movably suspended within the tubes by either a maglev system or wheels. The capsules travel in opposite directions in each tube so that the system provides back and forth transportation between two destinations. A fluid loop mechanism cycles a volume of air through the tubes as a means to propel the capsules through each tube. A series of fluid loop mechanism can be air multipliers as the volume of air cycles through the tubes. Two one-directional valves are located at opposite ends of the tubes and are used to transfer the kinetic energy for an arriving capsule within one tube into kinetic energy for a departing capsule within the other tube.

20 Claims, 14 Drawing Sheets

CIRCULATED PNEUMATIC TUBE TRANSIT SYSTEM

The current application claims a priority to the U.S. Provisional Patent application Ser. No. 61/823,195 filed on May 14, 2013.

FIELD OF THE INVENTION

The present invention is generally related to a mass transit system capable of running at extremely low energy consumption level, more specifically, to an ultra efficient circulated fluid (e.g. air) driven capsules in a pair of parallel pneumatic tubes by conserving and recycling the kinetic energy of the capsules.

BACKGROUND OF THE INVENTION

For centuries, scientists and engineers have been fighting with all kinds of medium induced resistance in the form of drag and friction. Wheels were invented to reduce the sliding friction from the ground; catamarans were invented to reduce the skin friction from water; and airplanes and maglev trains were invented to eliminate the rolling friction from wheels touching the ground. However, all of them have to deal with fluid resistance from air. Millions of dollars were spent on aerodynamic designs. Regardless of the effort, the fluid (air or water) resistance at high speed is too much to conquer which resulted in the limited speed of all means of transportation. The cause of these problems is fluid (air or water) is mostly still with the exception of movement in the form of currents (winds or ocean current) in random directions, which rarely helps in most means of transportation (gliders and sail boats are exceptions, but they can be difficult to commercialize). Pneumatic Tube Transport (PTT) (see U.S. Pat. No. 624,202, Pneumatic Carrier System) was invented a long time ago to transport small capsules inside a building. Evacuated Tube Transport (ETT) (see U.S. Pat. No. 5,950,543, Evacuated Tube Transport) was invented to transport capsules in an evacuated tube where the air resistance could theoretically be reduced to zero, but the ETT is extremely difficult to implement. An alternative (see WO2012079114, An Evacuated Tube Transport System) was proposed to the ETT, but to the applicant's knowledge, none have been successfully implemented. The reason is because current designs are not efficient enough or economically viable to transport passengers or cargo in a capsule over long distances. The present invention proposes to reverse all the established way of thinking by working with fluid (air) and use the fluid as a means of propulsion, energy storage and energy recycle instead of fighting against its resistance in a pair of parallel pneumatic tubes with circulated fluid (air) to conserve, recycle, and regenerate the kinetic energy of the transported capsules. Several improvements are proposed towards the PTT design to make the application in mass transit possible.

DETAILED DESCRIPTIONS OF THE INVENTION

All illustrations of the drawings are for the purpose of describing selected versions of the present invention and are not intended to limit the scope of the present invention.

Figure 1:
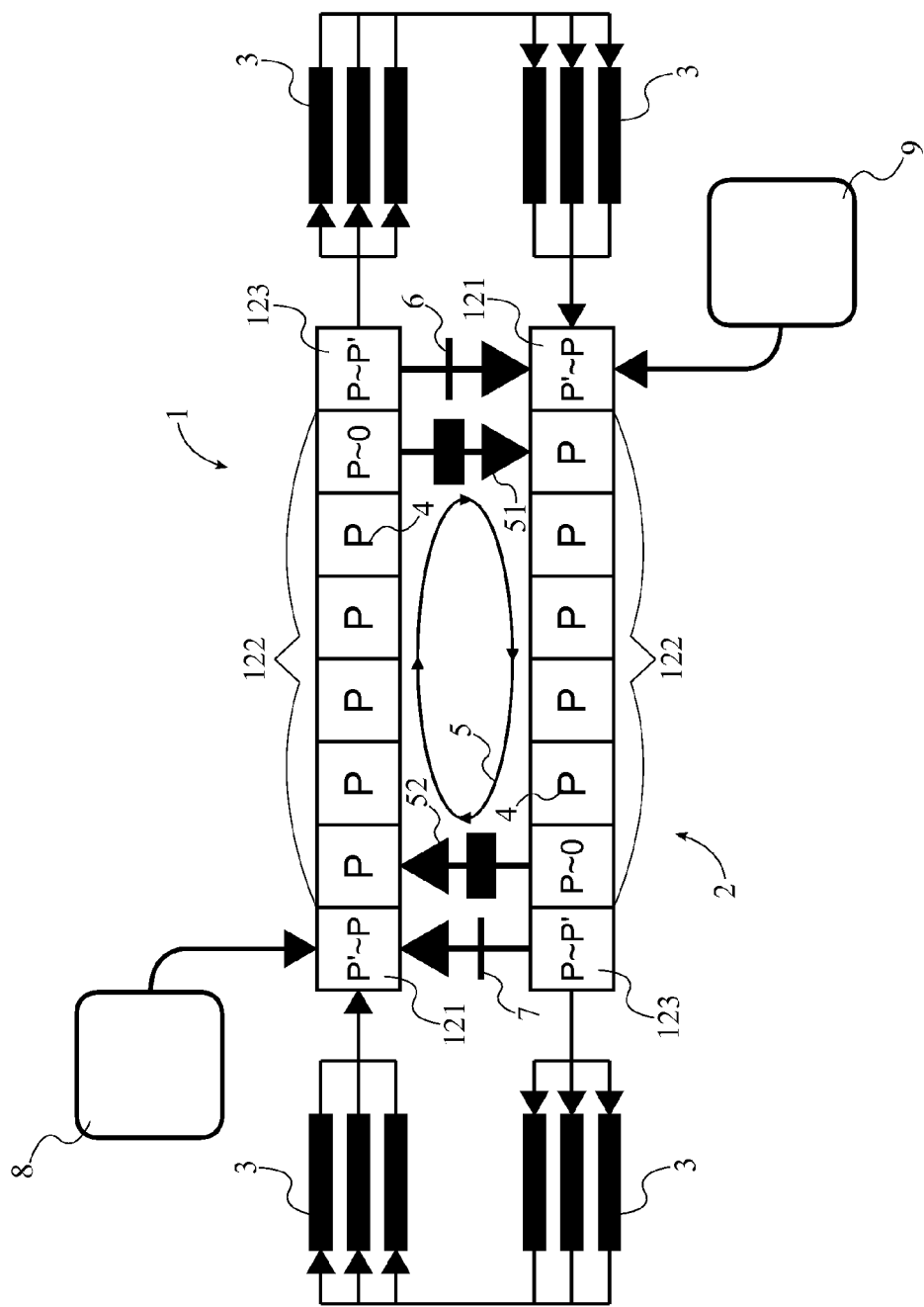
FIG. 1 is a conceptual model diagram of the present invention in order to illustrate the present invention in perfect conditions, which include no friction loss from the tubes and one fluid loop mechanism that is enough to sustain the entire system. P is the operating pressure of the entire system. P' is the release pressure of a one-directional valve.

As can be seen in FIG. 1, the present invention is a circulated pneumatic tube transit system that conserves the kinetic energy of cruising capsules and recycles the kinetic energy of arriving capsule in order to launch a departing capsule in the opposite direction. The present invention mainly comprises a first tube 1, a second tube 2, a plurality of capsules 3, a volume of air 4, an at least one fluid loop mechanism 5, a first one-directional valve 6, a second-one directional valve 7, a first pressure tank 8, and a second pressure tank 9. The first tube 1 and the second tube 2 are opposing pathways that allow the plurality of capsules 3 to travel back and forth along a predetermined route. The plurality of capsules 3 is the means by which the present invention carries either passengers or cargo and is movably levitated within the first tube 1 and the second tube 2 so that there is a small clearance between the outer surface of each capsule and the inner surface of a tube. The first tube 1 and the second tube 2 are positioned along each other because the kinetic energy of a capsule moving in one direction is used to pressurize a pocket of air 41 and launch another capsule in the opposite direction. Consequently, the first tube 1 and the second tube 2 each comprise an acceleration section 121, a deceleration section 123, and a cruising section 122. The acceleration section 121 is the tube portion where a capsule is accelerated from standing still to its cruising speed by compressed air coming from either a combination of one of the one-directional valves and pressure tanks or just one of the pressure tanks. The deceleration section 123 is the tube portion where a capsule is decelerated from its cruising speed to a stop by compressing the air in front of the capsule. The cruising section 122 is the tube portion where a capsule travels at its cruising speed. In the preferred embodiment of the present invention, the first tube 1 and the second tube 2 are structurally supported off the ground by a plurality of pylons 10. In some portions of the first tube 1 and the second tube 2, tunnels are used only when elevated structures are not feasible to reduce the construction cost.

The volume of air 4 is confined within the first tube 1 and the second tube 2 so that the at least one fluid loop mechanism 5, the first one-directional valve 6, and the second one-directional valve 7 can drive the volume of air 4 through the first tube 1 into the second tube 2 and vice versa. In other embodiments, any kind of fluid could be used to replace the volume of air 4, but air is the most convenient fluid to use for the present invention. More specifically, the deceleration section 123 of the first tube 1 is in fluid communication with the acceleration section 121 of the second tube 2 through the first one-directional valve 6, which allows compressed air to flow from the deceleration section 123 of the first tube 1 into the acceleration section 121 of the second tube 2. The first one-directional valve 6 is used to modulate the air pressure within the deceleration section 123 of the first tube 1 in order to slow down a capsule at a comfortable deceleration rate for its passengers and in order to convert the kinetic energy of the capsule into potential energy in the form of compressed air. Simultaneously, the compressed air is released by the first one-directional valve 6 into the acceleration section 121 of the second tube 2 in order to speed up another capsule at a comfortable acceleration rate for its passengers and to convert the potential energy in compressed air back into kinetic energy for the other capsule. The first pressure tank 8 is also in fluid communication with the acceleration section 121 of the first tube 1 so that the first pressure tank 8 can provide the startup energy during the initiation stage of the present invention in order to launch capsules from the acceleration section 121 of the first tube 1. This occurs during the initiation stage because the present invention has yet to recycle any kinetic energy from the deceleration section 123 of the second tube 2. Once the launching and receiving for the plurality of capsules 3 are synchronized on both ends of the first tube 1 and the second tube 2, the first pressure tank 8 can provide additional potential energy as compressed air in order to help launch a capsule by compensating for the energy loss during the two stages of energy conversion in the energy recycling and regeneration process.

Likewise, the deceleration section 123 of the second tube 2 is in fluid communication with the acceleration section 121 of the first tube 1 through the second one-directional valve 7, which allows compressed air to flow from the deceleration section 123 of the second tube 2 into the acceleration section 121 of the first tube 1. The second one-directional valve 7 is used to modulate the air pressure within the deceleration section 123 of the second tube 2 in order to slow down a capsule at a comfortable deceleration rate for its passengers and in order to convert the kinetic energy of the capsule into potential energy in the form of compressed air. Simultaneously, the compressed air is released by the second one-directional valve 7 into the acceleration section 121 of the first tube 1 in order to speed up another capsule at a comfortable acceleration rate for its passengers and to convert the potential energy in compressed air back into kinetic energy for the other capsule. The second pressure tank 9 is also in fluid communication with the acceleration section 121 of the second tube 2 so that the second pressure tank 9 can provide the startup energy during the initiation stage of the present invention in order to launch capsules from the acceleration section 121 of the second tube 2. This occurs during the initiation stage because the present invention has yet to recycle any kinetic energy from the deceleration section 123 of the first tube 1. Once the launching and receiving for the plurality of capsules 3 are synchronized on both ends of the first tube 1 and the second tube 2, the second pressure tank 9 can provide additional potential energy as compressed air in order to help launch a capsule by compensating for the energy loss during the two stages of energy conversion in the energy recycling and regeneration process.

Moreover, the launching and receiving of capsules will cause air molecules to leak from the present invention as capsules are loaded and unloaded from either the first tube 1 or the second tube 2. The same process will also cause air molecules to increase in the system from either the first pressure tank 8 or the second pressure tank 9 while launching capsules. Thus, the optimal pressure gradient should be determined and maintained for the present invention with the help of pressure release valves along the first tube 1 and the second tube 2 when system pressure is too high and with the help of the first pressure tank 8 and the second pressure tank 9 when the system pressure is too low. The launching and receiving of capsules have to be simultaneously coordinated in order to more efficiently recycle the kinetic energy of capsules.

The cruising section 122 of the first tube 1 and the cruising section 122 of the second tube 2 are in circular fluid communication by the at least one fluid loop mechanism 5, which maintains the cruising speed of the capsules within the cruising section 122 by compensating for the energy loss due to: the skin friction between the moving air and the inner surface of the first tube 1 and the second tube 2; the form friction from the curvatures of the first tube 1 and the second tube 2; and the form friction from the shape of the overall air box design 11 and fan blades for either a first compressor 51 or a second compressor 52, which are components of the at least one fluid loop mechanism 5. Due to the ingenious design of the present invention, the plurality of capsules 3 will not feel resistance in the form of aerodynamic drag. This feature and the energy recycle feature of the present invention will probably allow the average energy consumption per passenger or per unit weight of cargo to be lower than any form of transportation in existence today.

Figure 4:
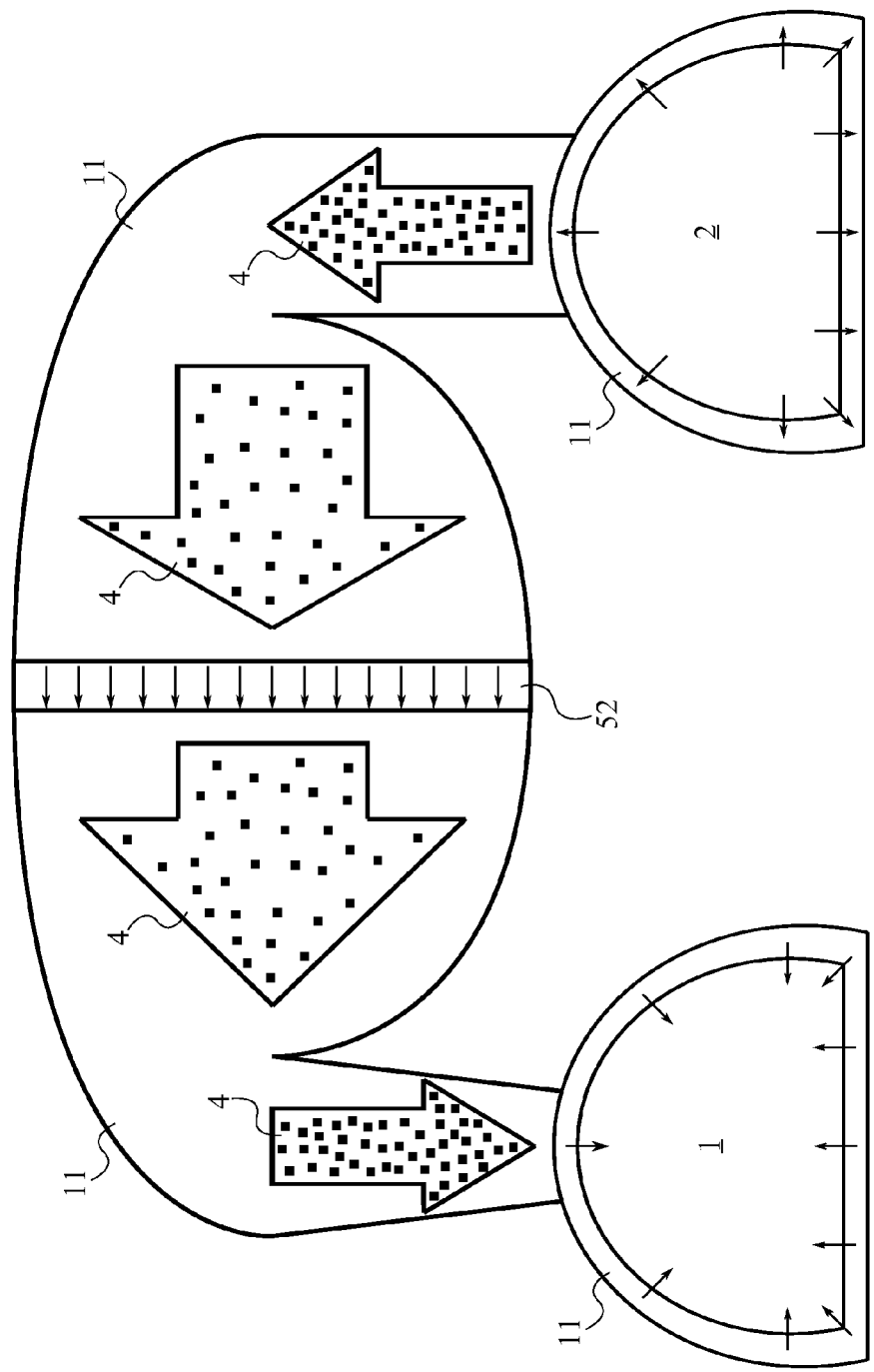
FIG. 4 is a cross sectional diagram of the airflow from one tube, through a compressor, and into another tube for the present invention.
Figure 5:
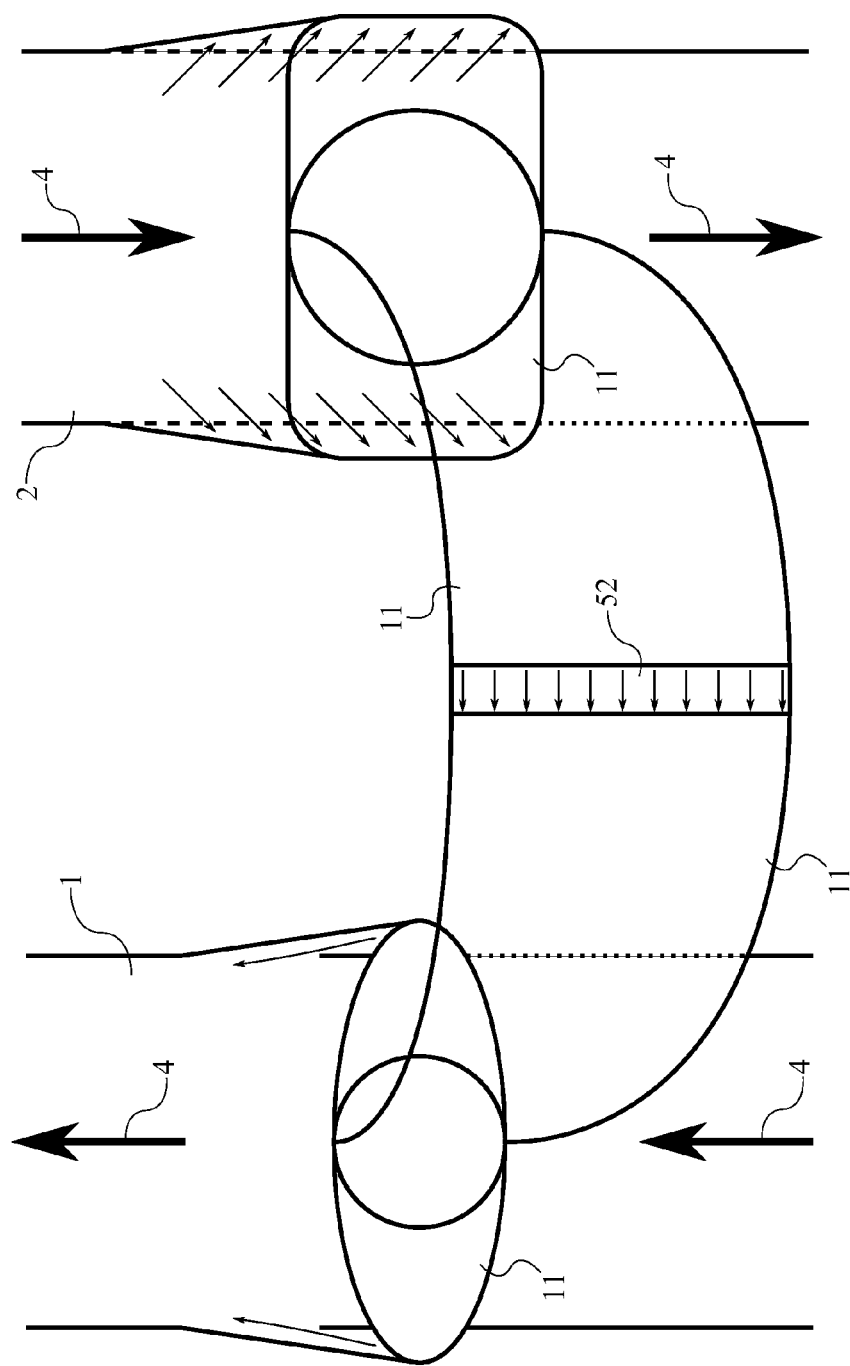
FIG. 5 is a top view diagram of the airflow from one tube, through a compressor, and into another tube for the present invention.

The volume of air 4 must be circularly driven around the cruising section 122 of the first tube 1 and the cruising section 122 of the second tube 2 in order to move the plurality of capsules 3 along the first tube 1 and the second tube 2. Consequently, the at least one fluid loop mechanism 5 uses the volume of air 4 as an energy storing medium. When the volume of air 4 is within the cruising section 122 of either the first tube 1 or the second tube 2, the volume of air 4 becomes a part of a fluid loop, whose speed is maintained by the at least one fluid loop mechanism 5. The at least one fluid loop mechanism 5 comprises the first compressor 51 and the second compressor 52. The first compressor 51 and the second compressor 52 are used to withdraw air from one tube and force air into another tube, which is illustrated in FIGS. 4 and 5. As a part of the fluid loop, the volume of air 4 traverses through the cruising section 122 of the first tube 1 and into the first compressor 51, which reduces the air pressure in front of the capsules travelling within the first tube 1. As another part of the fluid loop, the volume of air 4 traverses out of the first compressor 51 and into the cruising section 122 of the second tube 2, which increases the air pressure behind the capsules travelling within the second tube 2. As another part of the fluid loop, the volume of air 4 traverses through the cruising section 122 of the second tube 2 and into the second compressor 52, which reduces the air pressure in front of the capsules travelling within the second tube 2. As a final part of the fluid loop, the volume of air 4 traverses out of the second compressor 52 and into the cruising section 122 of the first tube 1, which increases the air pressure behind the capsules travelling within the first tube 1. The volume of air 4 is partitioned by the plurality of capsules 3 so that the volume of air 4 can be used as an energy storing medium with the help of the at least one fluid loop mechanism 5 in order to move the plurality of capsules 3 at their cruising speed within the cruising sections 122. The partitioning of the volume of air 4 will allow each pairing of capsules to have a pocket of air 41 in between them, and the pocket of air 41 will serve as a safety cushion so that each pairing of capsules never crashes into each other.

Figure 2:
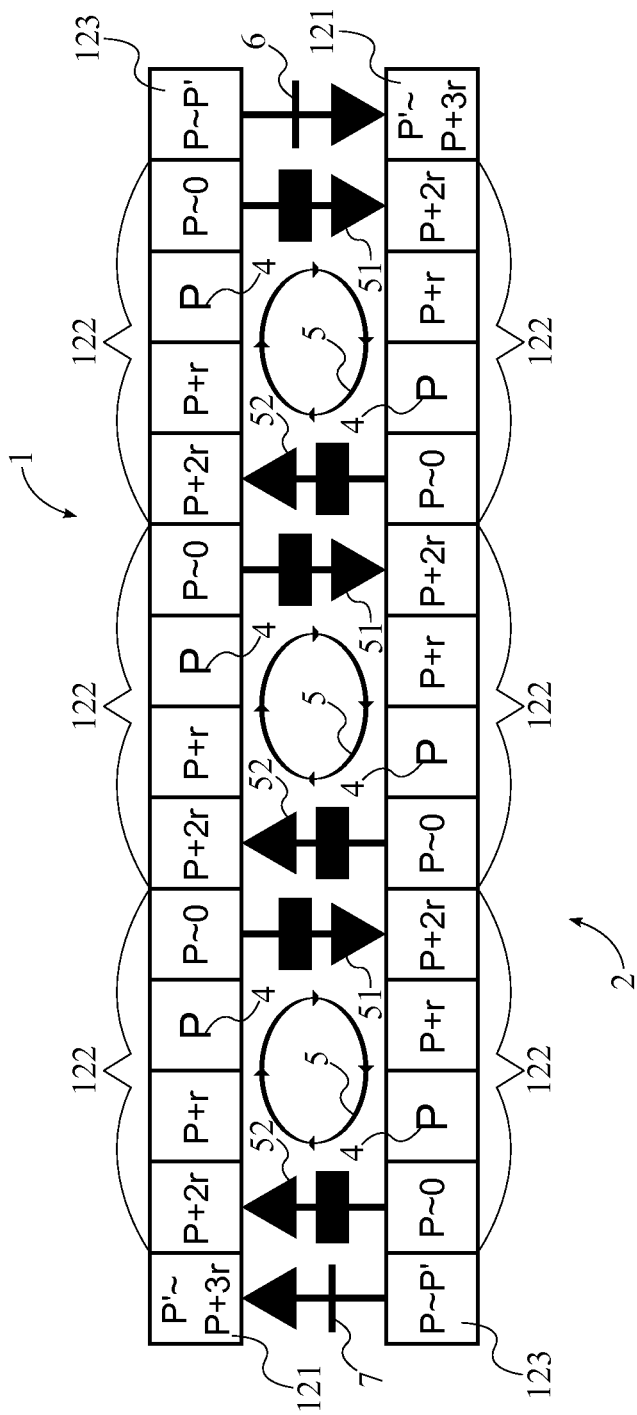
FIG. 2 is a practical model diagram of the present invention in order to illustrate the present invention in realistic conditions, which include friction loss from the tubes and multiple fluid loop mechanisms that are needed to sustain the entire system. P is the operating pressure of the entire system. P' is the release pressure of a one-directional valve. r is the extra pressure required to overcome the resistance to airflow by the inner surface of the tubes while transporting a capsule for a distance equal to the distance between each cruising capsule.
Figure 3:
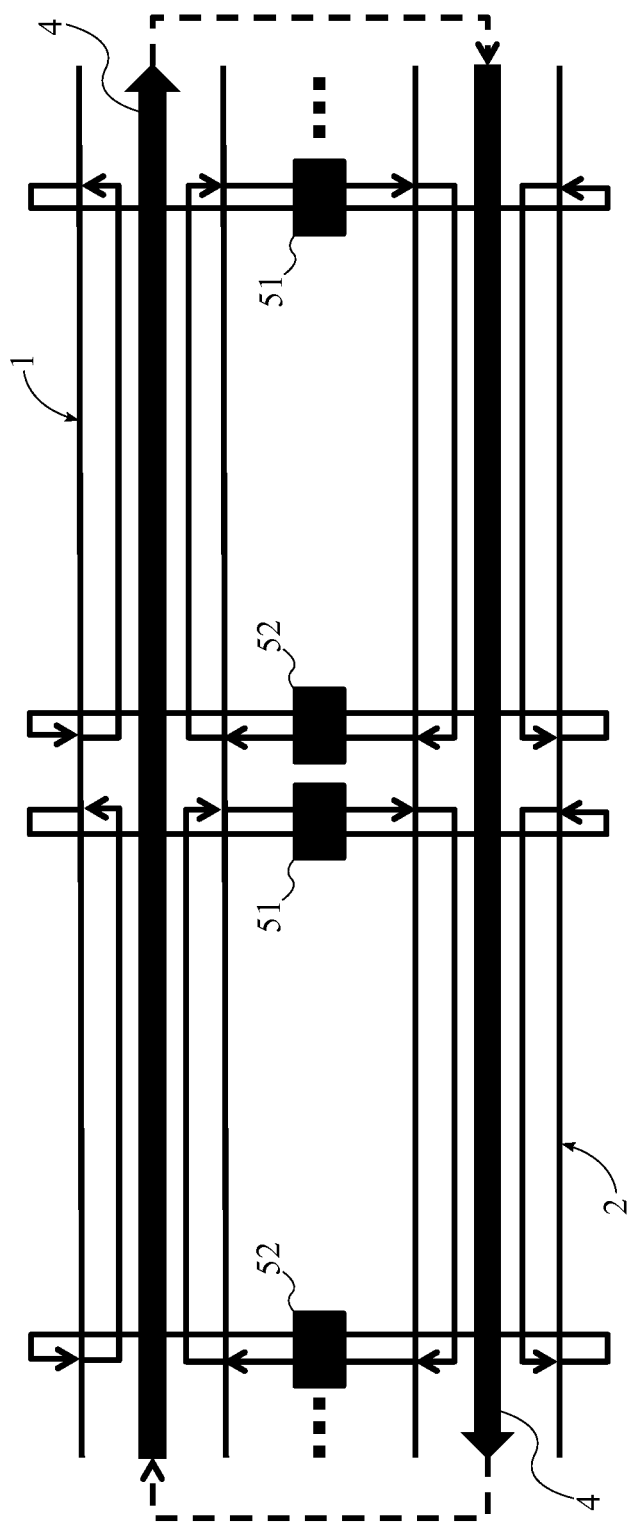
FIG. 3 is a model diagram illustrating the air multiplication concept through multiple fluid loop mechanisms for the present invention.

The first compressor 51 and the second compressor 52 are separated by a loop length, which is the length along both tubes that the volume of air 4 is being acted on by the fluid loop. The loop length is also positioned parallel with the cruising section 122 of both the first tube 1 and the second tube 2, which allows the loop length to define the distance that is travelled by capsules while those capsules are within the fluid loop. The loop length can be used to describe various properties of the present invention. For example, the pressure gradient within the cruising section 122 of either the first tube 1 or the second tube 2 can be described in terms of the loop length. If the loop length for a fluid loop is too long, then the pressure will be too high at the start of the cruising section 122. The construction of either the first tube 1 or the second tube 2 would require more expensive material to accommodate the higher pressure from a long loop length or would not be feasible at all. As can be seen in FIG. 2, a solution to this problem is to use a plurality of fluid loop mechanisms 5 instead of one large fluid loop mechanism 5. The plurality of fluid loop mechanisms 5 should be serially integrated along the cruising section 122 for both the first tube 1 and the second tube 2. Thus, the loop lengths for each of the plurality of fluid loop mechanisms 5 should be short enough to prevent the pressure from going too high at two starting end of each cruising section 122. In this case, the plurality of fluid loop mechanisms 5 act as a series of air multipliers to sustain the overall fluid loop circulating the entire cruising section 122 of both the first tube 1 and the second tube 2, which is illustrated in FIG. 3. Other benefits of this distributed design are: numerous smaller compressors could be used instead of a few large ones to improve the overall system reliability; smaller compressors also means lower power consumption by each compressor which opens the door to multi-power sourcing including solar power.

The loop length can also be used to describe the separation between the first compressor 51 and the second compressor 52 when the first tube 1 and the second tube 2 come across elevation changes on a predetermined route. The length of each fluid loop mechanism 5 should become shorter as either the airflow in the first tube 1 travels along an upward slope while the airflow in the second tube 2 travels along a downward slope or vice versa. Due to the force of gravity, the capsules travelling on an up-slope in either the first tube 1 or the second tube 2 will require extra energy to maintain their cruising speed as the pockets of air 41 between each pairing of capsules become more compressed. Correspondingly, the capsules traveling on a down-slope in either the second tube 2 or the first tube 1 will require less energy to maintain their cruising speed as the pockets of air between each paring of capsules become less compressed. In order to maintain the different pressure gradient between the first tube 1 and the second tube 2, a pressure difference should be applied to the fluid loop mechanism 5 by differentiating the power output between the first compressor 51 and the second compressor 52. The power differentiation should be solely determined by the relative elevation difference between the first compressor 51 and the second compressor 52. The compressor at the lower elevation in the fluid loop mechanism 5 should have more power output than the compressor at the higher elevation. If the present invention is connecting a pair of destinations with similar elevation but with elevation fluctuations in between them, the first tube 1 and the second tube 2 should have normal structural integrity with compressors of different power outputs that are positioned according to the concept described above. If the present invention is connecting a pair of destinations with a dramatic elevation difference between them, then the up-slope tube should have a greater structural integrity than the down-slope tube and should have a more powerful compressor in each fluid loop mechanism 5 that is positioned to the concept described above. The up-slope tube is operating constantly at higher-pressure gradient than the down-slope tube. However, due to the nature of the present invention, there is a limit on the steepest up-slope that the capsules can climb. Since the pressure gradient in the first tube 1 and the second tube 2 are opposite to each other, the theoretical max incline should be determined on a grade of slope when the effect of gravity along can compensate for the energy loss in the present invention to maintain a constant cruising speed for a capsule within the down-slope tube. In this case, the compressor at the higher elevation in the fluid loop mechanism 5 is not necessary. Additionally, if the present invention is connecting a pair of destinations with a dramatic elevation difference between them, then a capsule with a ballast can be used to carry water from a high elevation to a low elevation while an empty capsule is returned from the low elevation to the high elevation using gravity to help further save the overall energy consumption of the present invention.

Figure 8:
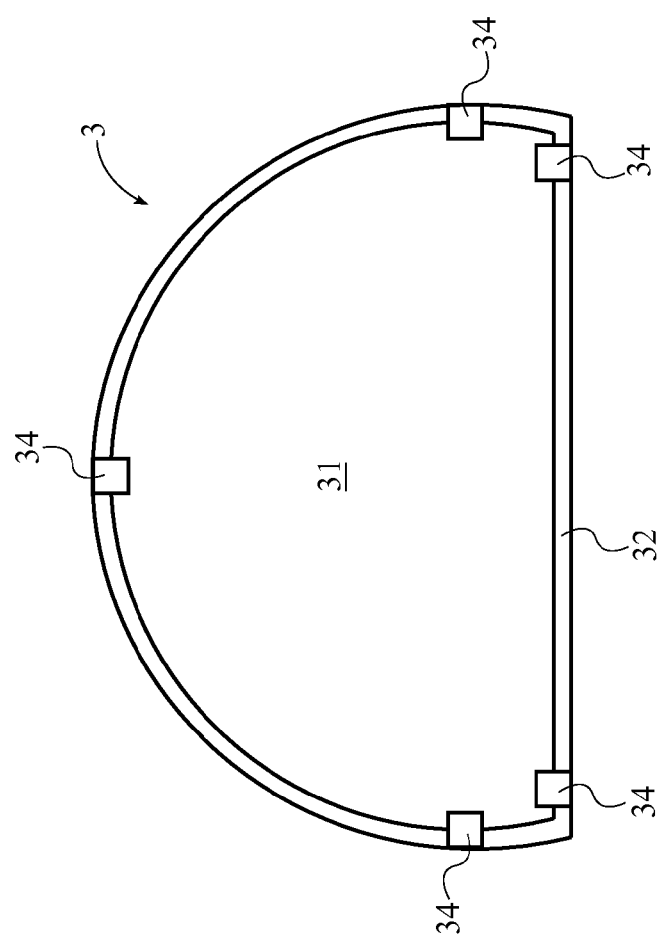
FIG. 8 is a cross sectional diagram of a capsule for the present invention.
Figure 9:
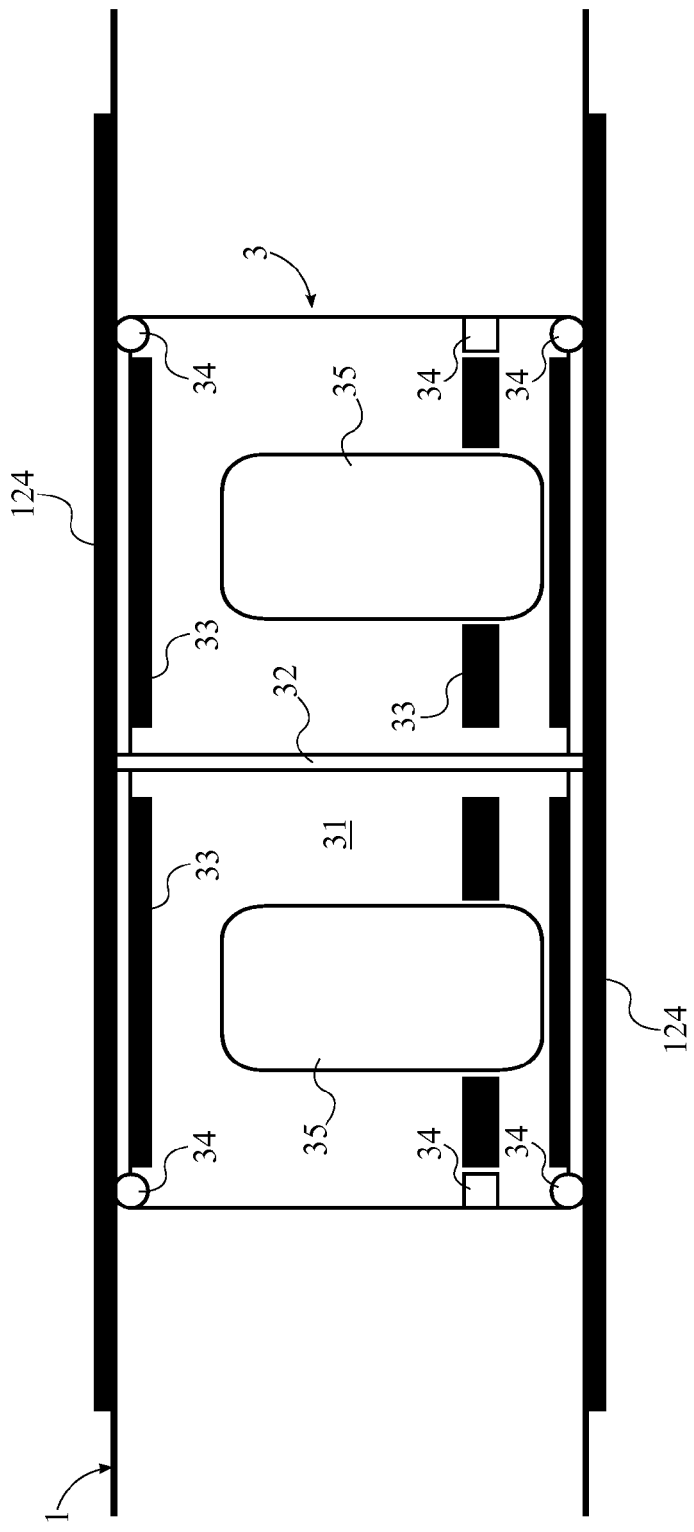
FIG. 9 is a side view diagram of a capsule within a tube for the present invention.
Figure 10:
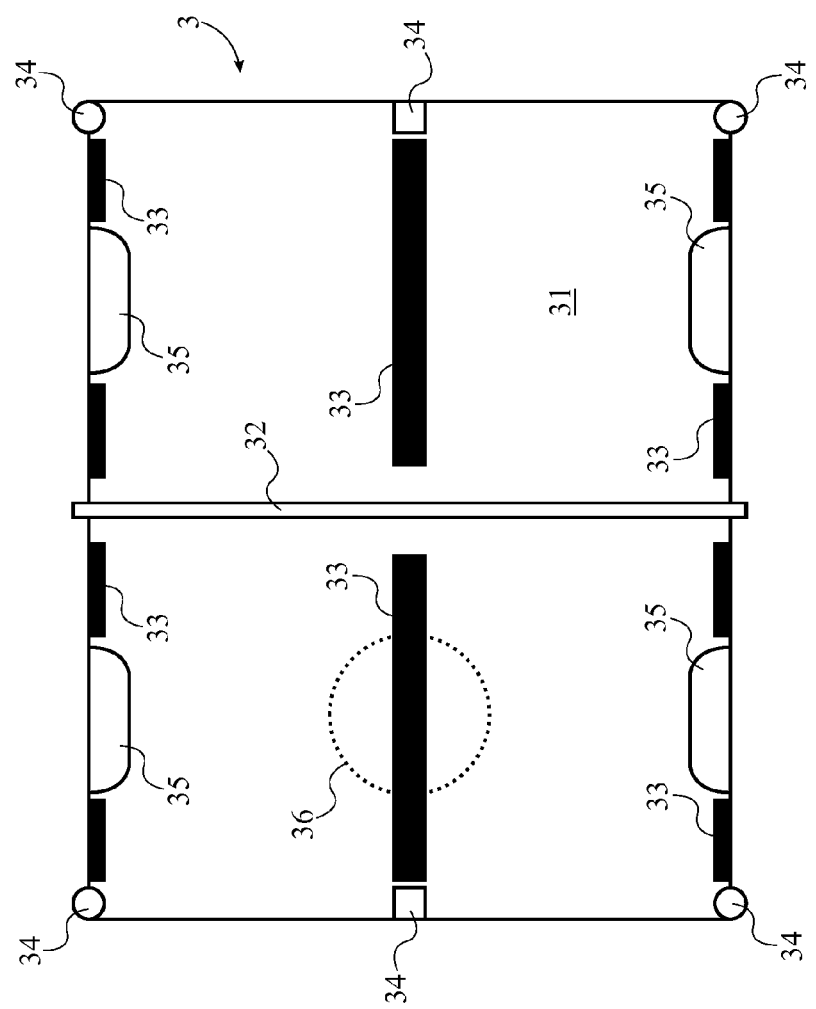
FIG. 10 is a top view diagram of a capsule for the present invention.

As can be seen in FIGS. 8, 9 and 10, the plurality of capsules 3 is designed to travel within either the first tube 1 or the second tube 2 with a very small clearance between the outer lateral surface of a capsule and the inner surface of a tube. Each of the plurality of capsules 3 comprises a fuselage 31, a retractable rubber seal 32, a plurality of permanent magnets 33, a plurality of retractable wheels 34, and a plurality of passenger doors 35. The fuselage 31 is the main body section of each capsule and is used to hold passengers and cargo. In the preferred embodiment of the present invention, the fuselage 31 has a circular cross section, which is the best at retaining its shape while pressurized. Also in the preferred embodiment, the front side and the rear side of the fuselage 31 should be perfectly flat so that the fuselage 31 can be easily manufactured and has the least aerodynamic shape, which is desired in a pneumatic transport system. The retractable rubber seal 32 allows each capsule to close off the small clearance between the outer lateral surface of a capsule and the inner surface of a tube, which can either be used to seal the first tube 1 and the second tube 2 from the atmosphere by placing a capsule at the end of both the acceleration section 121 and the deceleration section 123 for each tube. Additionally, the retractable rubber seal 32 can be used for braking the capsule in order to prevent a collision with another capsule or can be used in case of other emergencies. The retractable rubber seal 32 is laterally connected around the fuselage 31, which allows the retractable rubber seal 32 to readily engage or disengage from the inner surface of a tube. The retractable rubber seal 32 is also centrally positioned along the fuselage 31 so that the force applied by the retractable rubber seal 32, either through air pressure or braking, is evenly distributed along the fuselage 31. In the preferred embodiment, the retractable rubber seal 32 is a pneumatic, inflatable O-ring. In addition, the retractable rubber seal 32 could be designed to be speed sensitive and would automatically deploy during low speed and automatically retract during high speed. For safety purposes, proximity sensors should be fitted on each of the plurality of capsules 3. If any pairing of capsules was to get to close to each other, the retractable rubber seal 32 would automatically deploy so that the pairing of capsules will never get in contact with each other. The plurality of passenger doors 35 allows passengers/cargo to enter into and exit out of the fuselage 31. In the preferred embodiment, the plurality of passenger doors 35 is laterally located on the fuselage 31.

In reference to FIG. 9, the plurality of permanent magnets 33 is used to levitate the fuselage 31 so that the fuselage 31 is able to maintain the small clearance between the outer surface of the fuselage 31 and the inner surface of the tube. The plurality of permanent magnets 33 is laterally positioned along the fuselage 31 so that the plurality of permanent magnets 33 evenly levitates the fuselage 31 along its entire length. The plurality of permanent magnets 33 is evenly distributed about the fuselage 31 so that the same clearance between the outer surface of the fuselage 31 and the inner surface of tube is maintained around the entire fuselage 31. The plurality of permanent magnets 33 can be re-magnetized after certain number of runs in order to maintain the desired strength for the magnetic field. The first tube 1 and the second tube 2 each further comprise a maglev system 124 that are embedded along the entire length of the first tube 1 and the second tube 2 in order to couple with the plurality of permanent magnets 33 on each capsule. In one embodiment of the present invention, the maglev system 124 is a plurality of corresponding permanent magnets, which would be more feasible and less expensive to implement for levitating capsules than for levitating trains because a capsule typically weighs much less than a train. In another embodiment, the maglev system 124 is an array of inductive coils that use a capsule's movement to levitate the capsule within the first tube 1 and the second tube 2. Thus, for this embodiment of the maglev system 124, a capsule will start off by rolling on a set of wheels. Once the capsule is moving, the plurality of permanent magnets 33 will induce an opposing magnetic field from the bottom coils in order to achieve levitation and an opposing magnetic field from the side and upper coils in order to achieve stabilization. This type of passive maglev system 124 is low cost, energy efficient, and low maintenance. In either maglev embodiment, the fuselage 31 should be shaped with a flat bottom in order to best accommodate the plurality of permanent magnets 33 and eliminate the rotation of capsules inside the tube. Other embodiments of the present invention, the plurality of permanent magnets 33 can be coupled to any kind of maglev system 124 such as, but not limited, active maglev systems 124. The plurality of retractable wheels 34 are deployed in case of emergency such as the plurality of permanent magnets 33 stops functioning, and the small clearance between the outer surface of the fuselage 31 and the inner surface of the tube cannot be maintained by the plurality of permanent magnets 33. In order to maintain that same clearance, the plurality of retractable wheels 34 is laterally positioned around and along the fuselage 31 so that the fuselage 31 is evenly suspended along its entire length. In the preferred embodiment, the plurality of retractable wheels 34 needs to be placed only at the corners of the fuselage 31. In alternate embodiment, the plurality of retractable wheels 34 could replace the plurality of permanent magnets 33 as the means to movably suspend the fuselage 31 within a tube.

Figure 6:
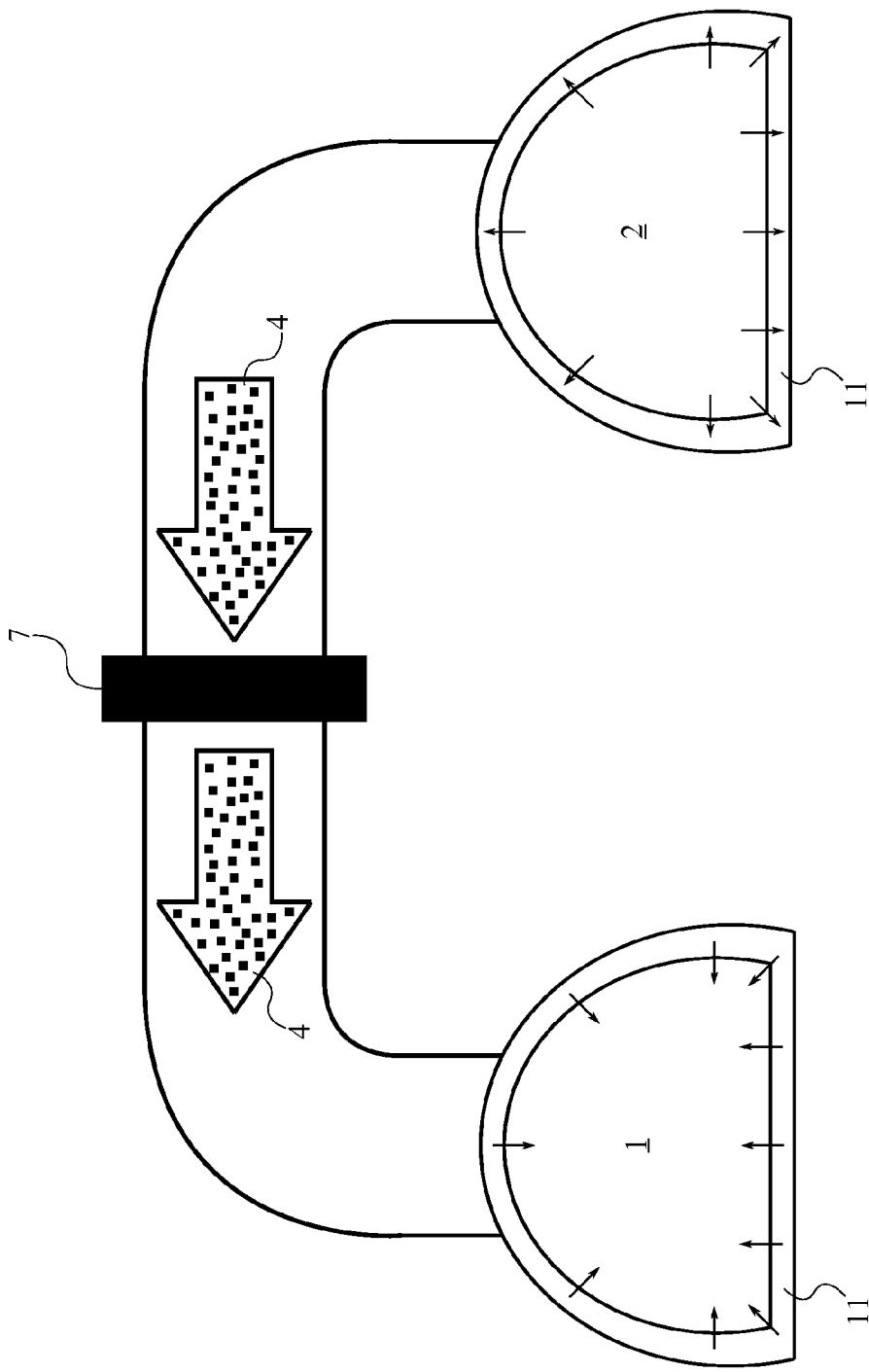
FIG. 6 is a cross sectional diagram of the airflow from one tube, through a one-directional valve, and into another tube for the present invention.
Figure 7:
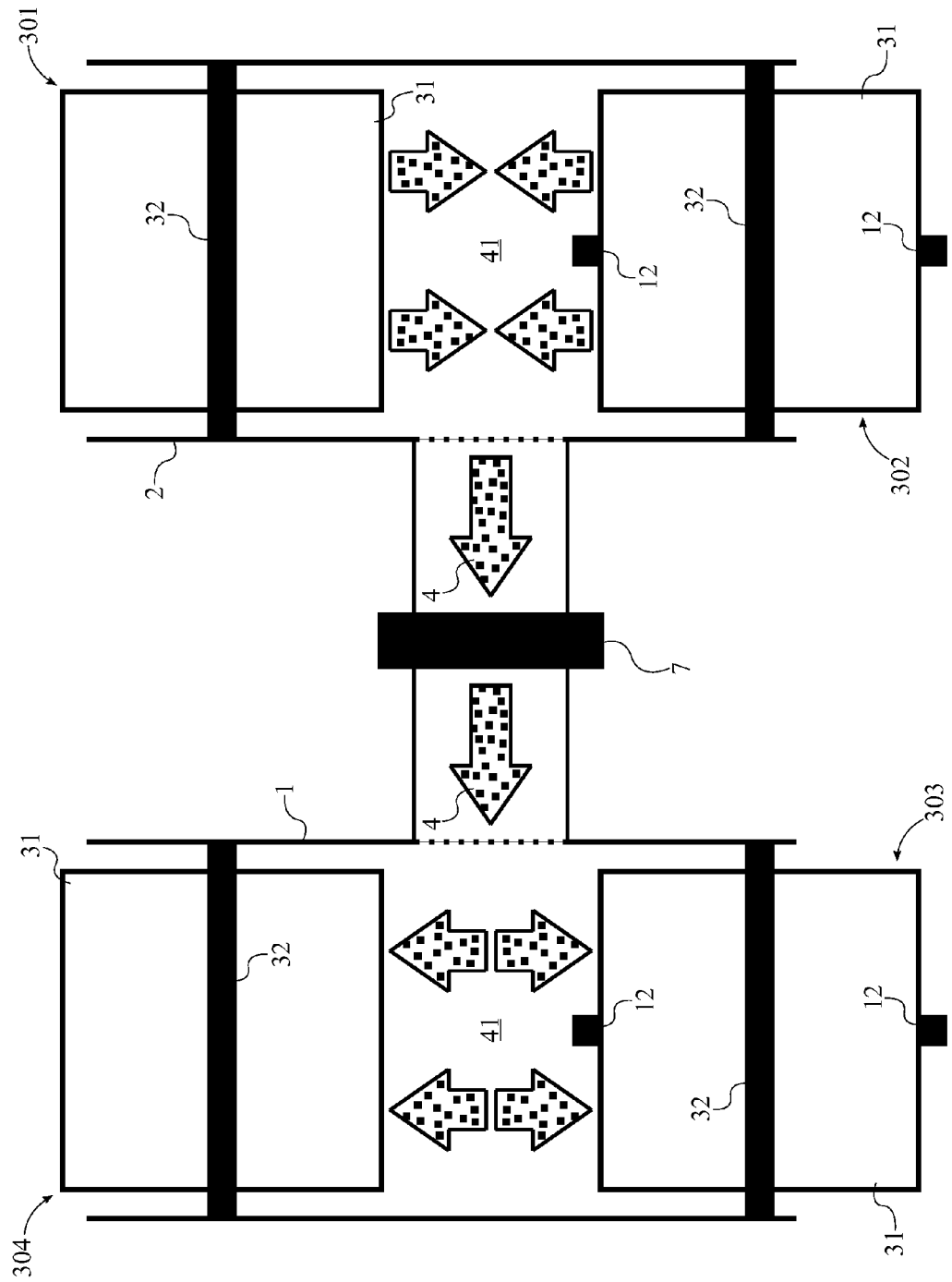
FIG. 7 is a top view diagram of the airflow from one tube, through a one-directional valve, and into another tube for the present invention. The air box for the one-directional valve is not shown in FIG. 7 in order to clearly show the general pattern of airflow through the one-directional tube.

As can be seen in FIGS. 6 and 7, the plurality of capsules 3 interacts with each other in a specific manner to recycle the kinetic energy of one capsule and to use that energy to launch another capsule. In order to describe these configurations hereinafter, the respective tube will refer to either the first tube 1 or the second tube 2, the respective one-directional valve will refer to either the first one-directional valve 6 or the second one-directional valve 7, and the respective pressure tank will refer to either the first pressure tank 8 or the second pressure tank 9. In terms of the deceleration section 123, the plurality of capsules 3 will always comprise an arriving capsule 301 that is slowing down within the deceleration section 123 and an arrived capsule 302 that is standing still at the end of the deceleration section 123. A pocket of air 41 is located in between the arriving capsule 301 and the arrived capsule 302 so that the pocket of air 41 compresses while slowing and cushioning the arriving capsule 301 approaching the arrived capsule 302. This compressed pocket of air 41 is then released through the respective one-directional valve into the corresponding acceleration section 121. The respective one-directional valve needs to be fluidly coupled to the respective tube in between the arriving capsule 301 and the arrived capsule 302 so that the respective one-directional valve is readily available to release the compressed pocket of air 41. In order to effectively utilize the pocket of air 41 as the means to decelerate the arriving capsule 301, the arrived capsule 302 is held in place at the very end of the respective tube by mechanical stops 12 while the retractable rubber seal 32 of the arrived capsule 302 is fully engaged to the respective tube. This prevents the pocket of air 41 from escaping between the arrived capsule 302 and the respective tube when compressed by the arriving capsule 301. In addition, the retractable rubber seal 32 of the arriving capsule 301 is engaging, but not touching, the respective tube in order to allow very small leak through the small clearance while the arriving capsule 301 and the arrived capsule 302 are compressing the pocket of air 41. The retractable rubber seal 32 of the arriving capsule 301 will fully engage to the respective tube at very low speed to further brake the arriving capsule 301 to a full stop right before the arriving capsule 301 collides with the arrived capsule 302.

Similarly, in terms of the acceleration section 121, the plurality of capsules 3 will always comprise a departing capsule 304 that is speeding up within the acceleration section 121 and an awaiting departure capsule 303 that is standing still at the end of the acceleration section 121. A compressed pocket of air 41 is released in between the awaiting departure capsule 303 and the departing capsule 304 so that the compressed pocket of air 41 can expand and launch the departing capsule 304 into the cruising section 122. The compressed pocket of air 41 is received through the respective one-directional valve from the corresponding deceleration section 123. The respective one-directional valve needs to be fluidly coupled to the respective tube in between the awaiting departure capsule 303 and the departing capsule 304 so that the respective one-directional valve is readily available to transfer the compressed pocket of air 41. In order to effectively utilize the pocket of air 41 as the means to accelerate the departing capsule 304, the awaiting departure capsule 303 is held in place at the very end of the respective tube by mechanical stops 12 while the retractable rubber seal 32 of the awaiting departure capsule 303 is fully engaged to the respective tube. This prevents the compressed air from escaping between the awaiting departure capsule 303 and the respective tube while expanding to launch the departing capsule 304. In addition, the retractable rubber seal 32 of the departing capsule 304 is disengaging from but still touching the respective tube to optimize the pressure force felt by the departing capsule 304 when the compressed pocket of air 41 expands in between the awaiting departure capsule 303 and the departing capsule 304. The retractable rubber seal 32 of the departing capsule 304 will continue to disengage from the respective tube as the departing capsule 304 accelerates to its cruising speed.

In the preferred embodiment, the design for the first tube 1 and the second tube 2 should be very similar to Alaskan oil pipelines. However, it should not have any sharp turns or abrupt down/up slopes to ensure maximum comfort for passengers. In general, the first tube 1 and the second tube 2 should be set up as elevated parallel tubes to ensure the least amount of vertical displacement due to the uneven terrain. Solar panels should be set up along the way on top of the first tube 1 and the second tube 2 in order to power the capsule transit system and to reduce the temperature of the tubes. Escape mechanisms should be built-in to prepare for emergency evacuation of a capsule. Scientific research and engineering in the field of fluid dynamics needs to be done to ensure the highest efficiency of air exchange at both ends and in between every fluid loop mechanisms 5.

Figure 11:
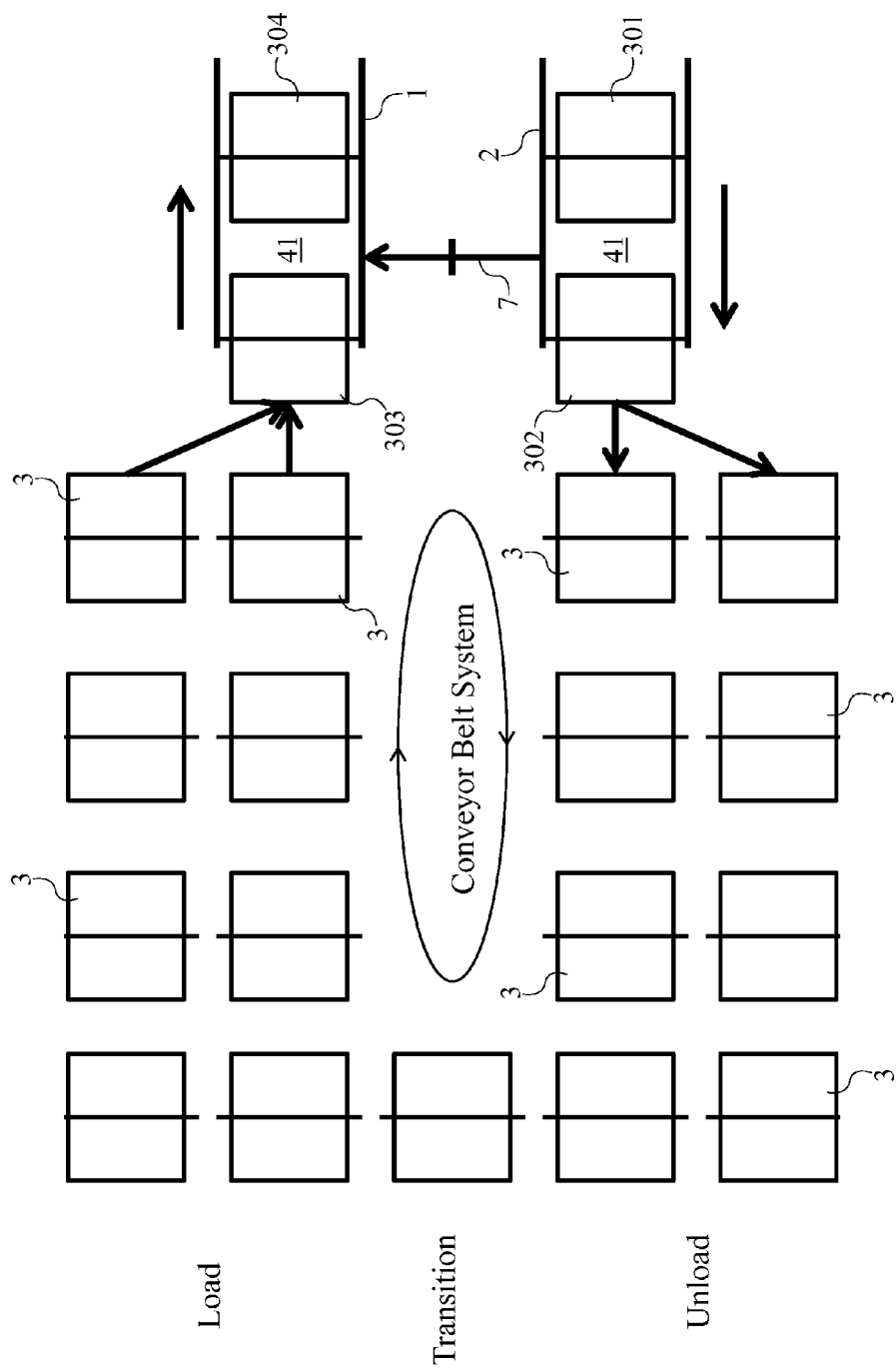
FIG. 11 is a model diagram of a starting terminal station for the present invention.
Figure 12:
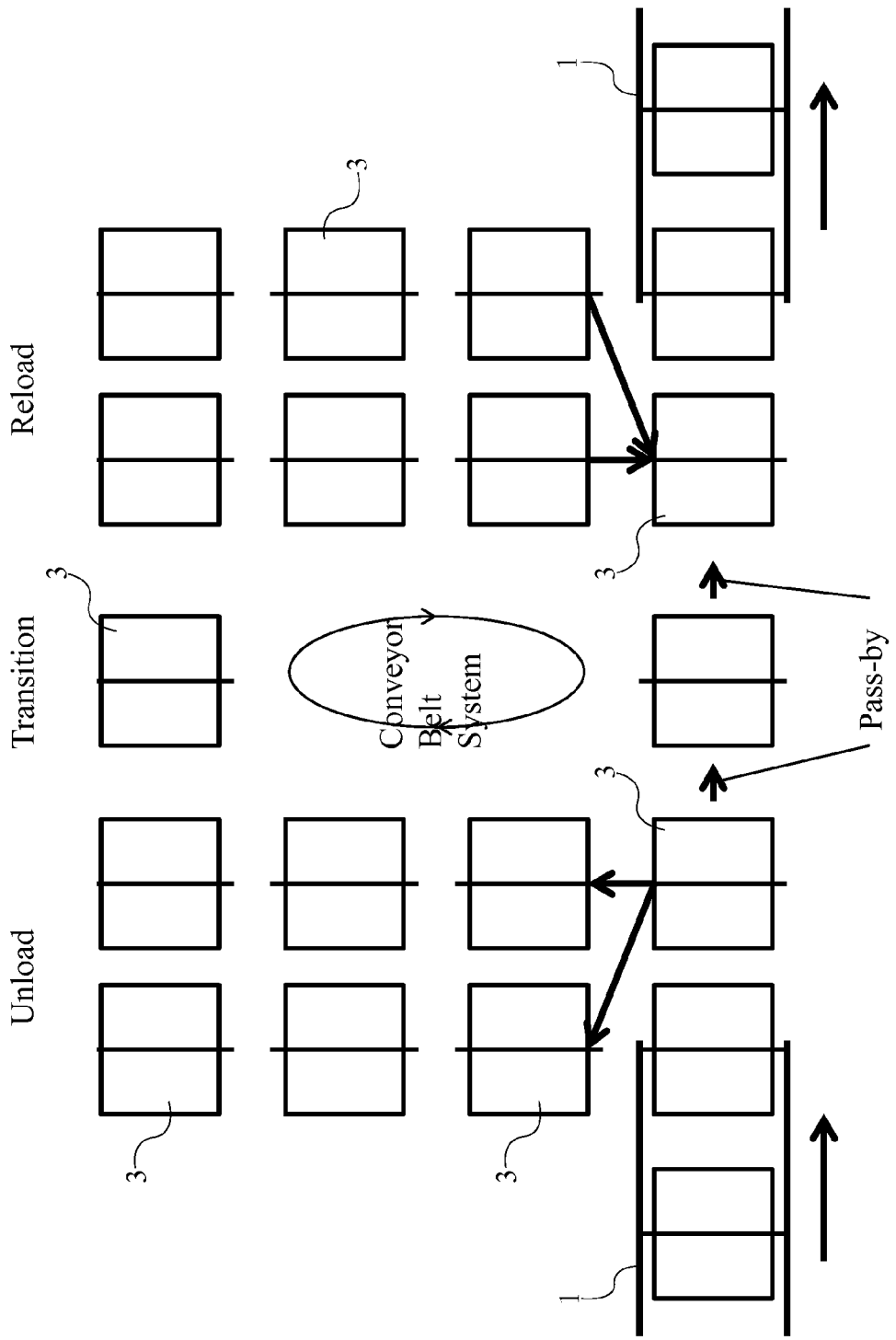
FIG. 12 is a model diagram of a stop station for the present invention.
Figure 13:
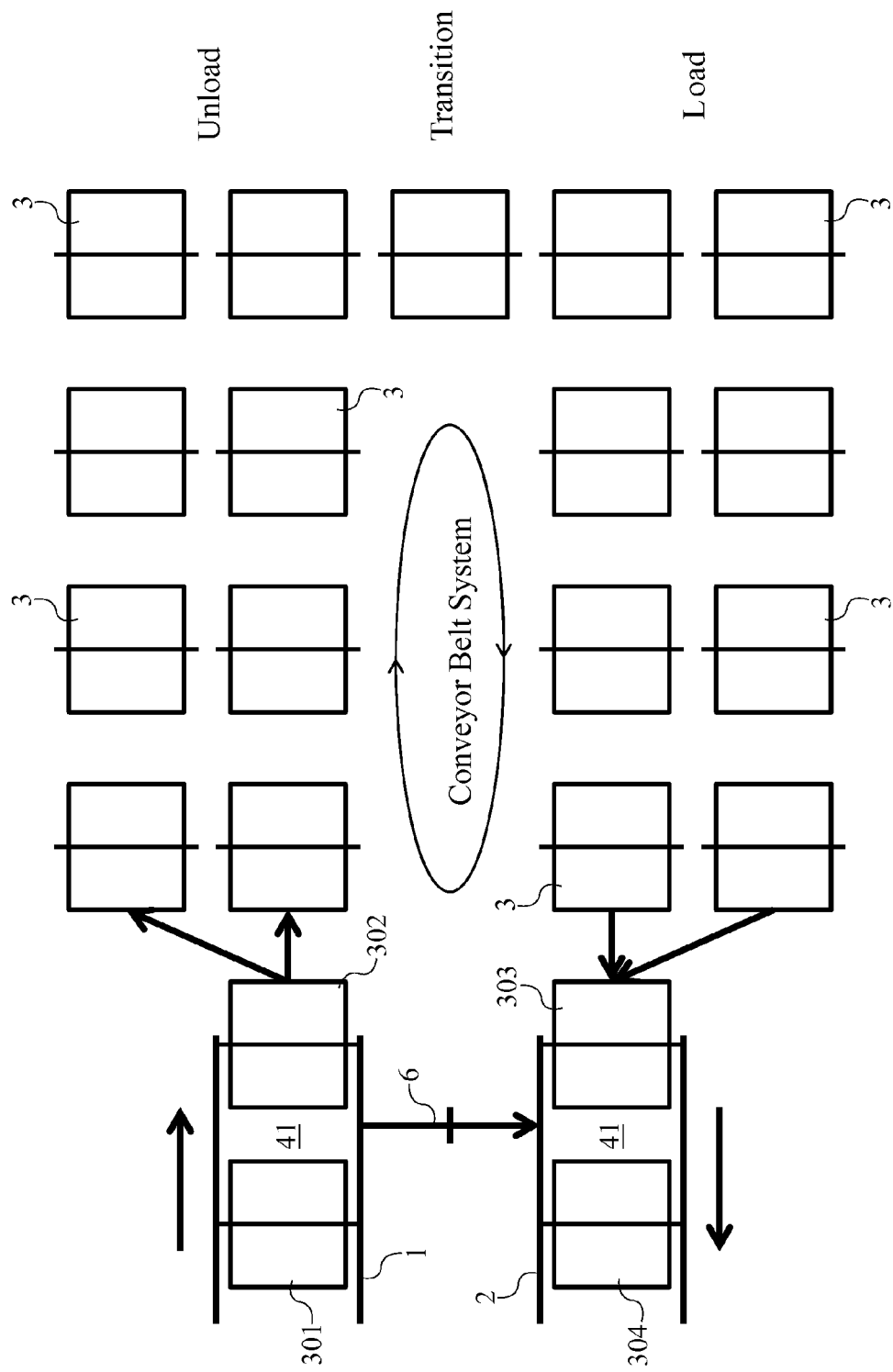
FIG. 13 is a model diagram of an ending terminal station for the present invention.

The present invention is designed to work as a mass transit system and should comprise a variety of stations for loading and unloading passengers. Each of these stations should comprise a conveyor belt system that moves a capsule about the station. In terminal embodiment of a station shown in FIGS. 11 and 13, the conveyor belt system moves a capsule from the end of one tube to an area where the capsule can unload and load passengers/cargo. In this embodiment, the capsule is finally inserted into another tube by the conveyor belt system in order to travel in the opposite direction. In the stop embodiment of a station shown in FIG. 12, the conveyor belt system moves a capsule from the end of one tube to an area where the capsule can unload and reload passengers/cargo or immediately moves the capsule from the end of one tube into another tube in order to travel in the same direction. The latter occurs when the capsule does not need to unload or reload passengers/cargo at a particular stop. If the former occurs, then the capsule is inserted into the other tube once unload and reload is done. In addition, to reduce the cost of the present invention, the first tube 1 and the second tube 2 can be routed along electric power lines wherever they are available to the present invention. This allows the first tube 1 and the second tube 2 to follow relatively straight paths and provides relatively unused land to build the present invention upon because owners of private lands are usually noncompliant with building mass transit systems through their lands. Passengers/cargo will be protected from the electromagnetic radiation coming from the electric power lines because the first tube 1 and the second tube 2 will be configured as a Faraday cage or each of the plurality of capsules 3 will be configured as a Faraday cage using materials with high conductivity. Building the present invention along electric power lines will also prevent vandalism because people fear the danger from electromagnetic radiation and electric shock.

Figure 14:
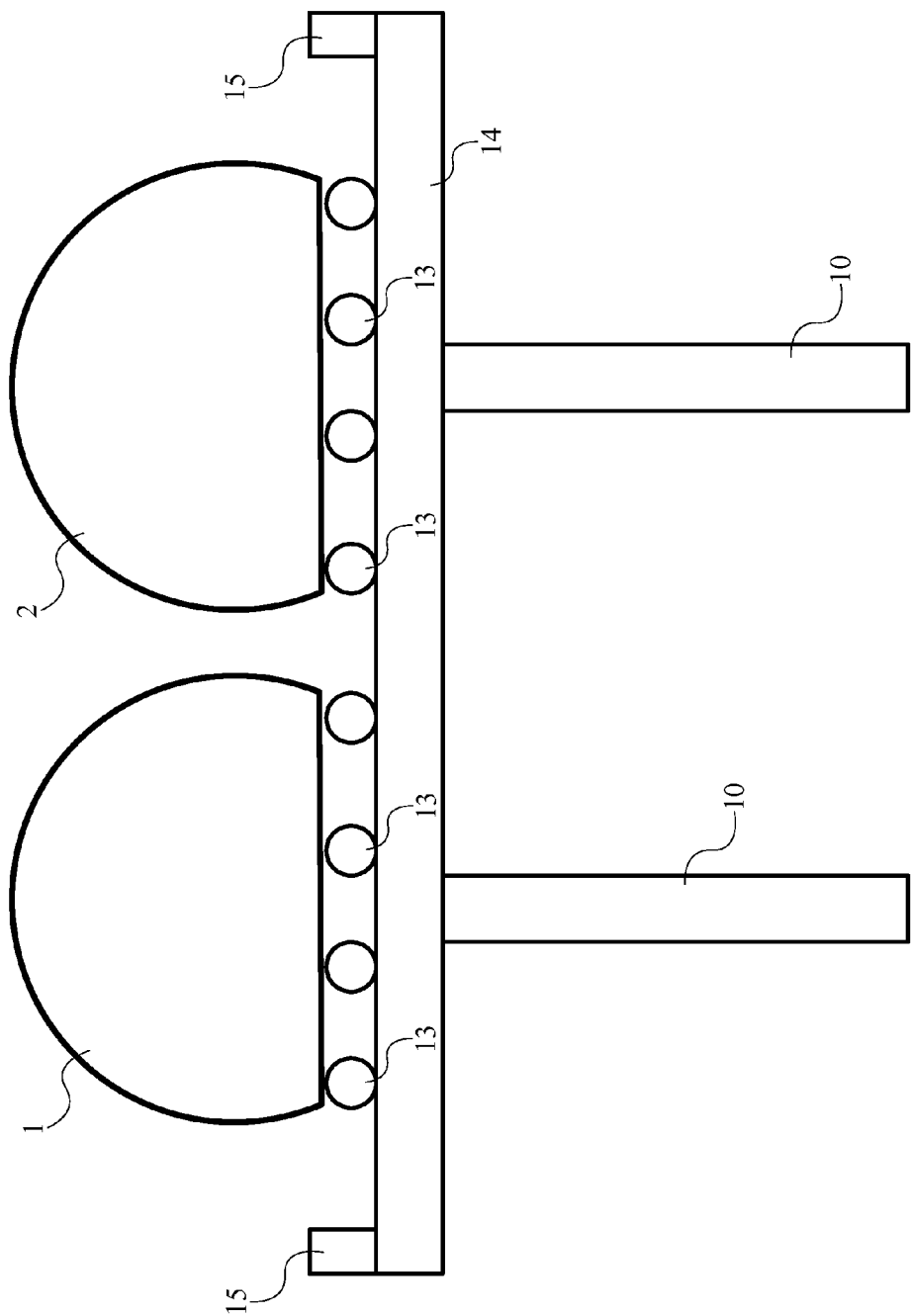
FIG. 14 is a cross sectional diagram for the means to provide lateral movement to the tubes for the present invention.

The present invention could also include a number of miscellaneous features in order to assist its overall effectiveness and efficiency. In reference to FIG. 10, one such feature is that the plurality of capsules 3 should each have an escape door 36 on the bottom, which is automatically engaged to the nearest hatch on the bottom of the first tube 1 or the second tube 2. The hatch leads to a hatchway that is positioned through each pylon 10 so that a passenger can escape safely down the pylon at any location. As can be seen in FIG. 14, another such feature is a means to allow the first tube 1 and the second tube 2 to slide perpendicularly to the travelling direction of the plurality of capsules 3, which would be used to prevent structural failure of the present invention during an earthquake and would allow for some leeway in case the first tube 1 and the second tube 2 contract/expand in terms of their length because of the temperature shift during the changing seasons. Such a means would comprise a plurality of sliders 13 attached to the bottom of both the first tube 1 and the second tube 2 moving along a sliding rail 14 fixated on top of each pylon 10. The sliding rail 14 would also have rubber stops 15 at both ends so that the first tube 1 and the second tube 2 could not fall off the sliding rail 14. Another such feature would be a temperature control system that would encompass the entire length of the first tube 1 and the second tube 2. The temperature control system is needed for the present invention implemented in locations with extreme weather conditions and between locations with huge volumes of passengers or cargo because the volume of air 4 may heat up from skin friction with the inner surface of the first tube 1 and the second tube 2 under continuous high speed runs. In one embodiment of the present invention, the temperature control system is a plurality of liquid pipes wrapped around the outer surface of both the first tube 1 and the second tube 2.

Although the invention has been explained in relation to its preferred embodiment, it is to be understood that many other possible modifications and variations can be made without departing from the spirit and scope of the invention as hereinafter claimed.

What is claimed is:

1. A circulated pneumatic tube transit system comprises:
a first tube;
a second tube;
a plurality of capsules;
a volume of air;
an at least one fluid loop mechanism;
a first one-directional valve;
a second one-directional valve;
a first pressure tank;
a second pressure tank;
said first tube and said second tube each comprise an acceleration section, a cruising section, and a deceleration section;
said at least one fluid loop mechanism comprises a first compressor and a second compressor;
said first tube and said second tube being positioned along each other;
said volume of air being confined within said first tube and said second tube;
said plurality of capsules being movably levitated within said first tube and said second tube;
said deceleration section of first tube being in fluid communication with said acceleration section of second tube through said first one-directional valve;
said deceleration section of second tube being in fluid communication with said acceleration section of said first tube through said second one-directional valve; and
said cruising section of said first tube and said cruising section of said second tube being in circular fluid communication by said at least one fluid loop mechanism.

2. The circulated pneumatic tube transit system as claimed in claim 1 comprises:
said volume of air traversing through said cruising section of said first tube and into said first compressor;
said volume of air traversing out of said first compressor and into said cruising section of said second tube;

said volume of air traversing through said cruising section of said second tube and into said second compressor;

said volume of air traversing out of said second compressor and into said cruising section of said first tube; and said first compressor and said second compressor being separated by a loop length, wherein said loop length is positioned parallel with said cruising section of both said first tube and said second tube.

3. The circulated pneumatic tube transit system as claimed in claim 1 comprises:

said at least one fluid loop mechanism being a plurality of fluid loop mechanisms; and said plurality of fluid loop mechanisms being serially integrated along said cruising section for both said first tube and said second tube.

4. The circulated pneumatic tube transit system as claimed in claim 1 comprises:

said first pressure tank being in fluid communication with said acceleration section of said first tube; and said second pressure tank being in fluid communication with said acceleration section of said second tube.

5. The circulated pneumatic tube transit system as claimed in claim 1 comprises:

said volume of air being a medium for energy regeneration during capsule acceleration, a medium for energy storage during capsule cruising, and a medium for energy recycle during capsule deceleration;

said volume of air being partitioned by said plurality of capsules, wherein a pocket of air is positioned in between each pairing of capsules and is used as a safety cushion between each pairing of capsules; and said plurality of capsules being driven within said first tube and said second tube by said volume of air, wherein said at least one fluid loop mechanism maintains cruising speed for each of said plurality of capsules and said volume of air within said at least one fluid loop mechanism by compensating for frictional energy loss between said volume of air and said at least one fluid loop mechanism.

6. The circulated pneumatic tube transit system as claimed in claim 1 comprises:

each of said plurality of capsules comprises a fuselage, a retractable rubber seal, a plurality of permanent magnets;

said retractable rubber seal being laterally connected around said fuselage;

said retractable rubber seal being centrally positioned along said fuselage;

said plurality of permanent magnets being laterally positioned along said fuselage; and said plurality of permanent magnets being evenly distributed about said fuselage.

7. The circulated pneumatic tube transit system as claimed in claim 6 comprises:

said first tube and said second tube each further comprise a maglev system;

said maglev system of said first tube being embedded along said first tube;

said maglev system of said second tube being embedded along said second tube; and said maglev system for both said first tube and said second tube being configured to couple to said plurality of permanent magnets on each of said plurality of capsules.

8. The circulated pneumatic tube transit system as claimed in claim 6 comprises:

each of said plurality of capsules further comprise a plurality of retractable wheels; and said plurality of retractable wheels being laterally positioned around and along said fuselage.

9. The circulated pneumatic tube transit system as claimed in claim 6 comprises:

a respective tube, wherein said respective tube is either the first tube or said second tube;

a respective one-directional valve, wherein said respective one-directional valve is either said first one-directional valve or said second one-directional valve;

said plurality of capsules comprises an arriving capsule and an arrived capsule;

said retractable rubber seal of said arrived capsule being engaged to said respective tube;

said arrived capsule being held within said respective tube by mechanical stops;

said retractable rubber seal of said arriving capsule being engaged to said respective tube, wherein said retractable rubber seal of said arriving capsule will gradually engage as said arriving capsule decelerates through said respective tube;

said respective one-directional valve being fluidly coupled to said respective tube in between said arriving capsule and said arrived capsule; and a pocket of air being compressed between said arriving capsule and said arrived capsule into said respective one-directional valve, wherein said pocket of air is used to decelerate said arriving capsule.

10. The circulated pneumatic tube transit system as claimed in claim 6 comprises:

a respective tube, wherein said respective tube is either the first tube or said second tube;

a respective one-directional valve, wherein said respective one-directional valve is either said first one-directional valve or said second one-directional valve;

a respective pressure tank, wherein said respective pressure tank is either said first pressure tank or said second pressure tank;

said plurality of capsules comprises a departing capsule and an awaiting departure capsule;

said retractable rubber seal of said awaiting departure capsule being engaged to said respective tube;

said awaiting departure capsule being held within said respective tube by mechanical stops;

said retractable rubber seal of said departing capsule being engaged to said respective tube, wherein said retractable rubber seal of said departing capsule will gradually disengage as said departing capsule accelerates through said respective tube;

said respective one-directional valve being fluidly coupled to said respective tube in between said awaiting departure capsule and said departing capsule;

said respective pressure tank being fluidly coupled to said respective tube in between said departing capsule and said awaiting departure capsule; and an expanding pocket of air being released by said respective one-directional valve in between said awaiting departure capsule and said departing capsule, wherein said expanding pocket of air is assisted by said respective pressure tank in order to accelerate said departing capsule.

11. The circulated pneumatic tube transit system as claimed in claim 1 comprises:

said first tube and said second tube being arranged on predetermined routes along electric power lines.

12. The circulated pneumatic tube transit system as claimed in claim 11 comprises:

said first tube and said second tube being configured as a Faraday cage.

13. The circulated pneumatic tube transit system as claimed in claim 11 comprises:
each of said plurality of capsules being configured as a Faraday cage.

14. A circulated pneumatic tube transit system comprises:
a first tube;
a second tube;
a plurality of capsules;
a volume of air;
an at least one fluid loop mechanism;
a first one-directional valve;
a second one-directional valve;
a first pressure tank;
a second pressure tank;
said first tube and said second tube each comprise an acceleration section, a cruising section, and a deceleration section;
said at least one fluid loop mechanism comprises a first compressor and a second compressor;
said first tube and said second tube being positioned along each other;
said volume of air being confined within said first tube and said second tube;
said plurality of capsules being movably levitated within said first tube and said second tube;
said deceleration section of first tube being in fluid communication with said acceleration section of second tube through said first one-directional valve;
said deceleration section of second tube being in fluid communication with said acceleration section of said first tube through said second one-directional valve;
said cruising section of said first tube and said cruising section of said second tube being in circular fluid communication by said at least one fluid loop mechanism;
said volume of air traversing through said cruising section of said first tube and into said first compressor;
said volume of air traversing out of said first compressor and into said cruising section of said second tube;
said volume of air traversing through said cruising section of said second tube and into said second compressor;
said volume of air traversing out of said second compressor and into said cruising section of said first tube;
said first compressor and said second compressor being separated by a loop length, wherein said loop length is positioned parallel with said cruising section of both said first tube and said second tube;
said first pressure tank being in fluid communication with said acceleration section of said first tube; and
said second pressure tank being in fluid communication with said acceleration section of said second tube.

15. The circulated pneumatic tube transit system as claimed in claim 14 comprises:
said at least one fluid loop mechanism being a plurality of fluid loop mechanisms; and
said plurality of fluid loop mechanisms being serially integrated along said cruising section for both said first tube and said second tube.

16. The circulated pneumatic tube transit system as claimed in claim 14 comprises:
said volume of air being a medium for energy regeneration during capsule acceleration, a medium for energy storage during capsule cruising, and a medium for energy recycle during capsule deceleration;
said volume of air being partitioned by said plurality of capsules, wherein a pocket of air is positioned in between each pairing of capsules and is used as a safety cushion between each pairing of capsules; and
said plurality of capsules being driven within said first tube and said second tube by said volume of air, wherein said at least one fluid loop mechanism maintains cruising speed for each of said plurality of capsules and said volume of air within said at least one fluid loop mechanism by compensating for frictional energy loss between said volume of air and said at least one fluid loop mechanism.

17. The circulated pneumatic tube transit system as claimed in claim 14 comprises:
each of said plurality of capsules comprises a fuselage, a retractable rubber seal, a plurality of permanent magnets, and a plurality of retractable wheels;
said retractable rubber seal being laterally connected around said fuselage;
said retractable rubber seal being centrally positioned along said fuselage;
said plurality of permanent magnets being laterally positioned along said fuselage;
said plurality of permanent magnets being evenly distributed about said fuselage;
said first tube and said second tube each further comprise a maglev system;
said maglev system of said first tube being embedded along said first tube;
said maglev system of said second tube being embedded along said second tube;
said maglev system for both said first tube and said second tube being configured to couple to said plurality of permanent magnets on each of said plurality of capsules; and
said plurality of retractable wheels being laterally positioned around and along said fuselage.

18. The circulated pneumatic tube transit system as claimed in claim 17 comprises:
a respective tube, wherein said respective tube is either the first tube or said second tube;
a respective one-directional valve, wherein said respective one-directional valve is either said first one-directional valve or said second one-directional valve;
said plurality of capsules comprises an arriving capsule and an arrived capsule;
said retractable rubber seal of said arrived capsule being engaged to said respective tube;
said arrived capsule being held within said respective tube by mechanical stops;
said retractable rubber seal of said arriving capsule being engaged to said respective tube, wherein said retractable rubber seal of said arriving capsule will gradually engage as said arriving capsule decelerates through said respective tube;
said respective one-directional valve being fluidly coupled to said respective tube in between said arriving capsule and said arrived capsule; and
a pocket of air being compressed between said arriving capsule and said arrived capsule into said respective one-directional valve, wherein said pocket of air is used to decelerate said arriving capsule.

19. The circulated pneumatic tube transit system as claimed in claim 17 comprises:
a respective tube, wherein said respective tube is either the first tube or said second tube;
a respective one-directional valve, wherein said respective one-directional valve is either said first one-directional valve or said second one-directional valve;

a respective pressure tank, wherein said respective pressure tank is either said first pressure tank or said second pressure tank;

said plurality of capsules comprises a departing capsule and an awaiting departure capsule;

said retractable rubber seal of said awaiting departure capsule being engaged to said respective tube;

said awaiting departure capsule being held within said respective tube by mechanical stops;

said retractable rubber seal of said departing capsule being engaged to said respective tube, wherein said retractable rubber seal of said departing capsule will gradually disengage as said departing capsule accelerates through said respective tube;

said respective one-directional valve being fluidly coupled to said respective tube in between said awaiting departure capsule and said departing capsule;

said respective pressure tank being fluidly coupled to said respective tube in between said departing capsule and said awaiting departure capsule; and an expanding pocket of air being released by said respective one-directional valve in between said awaiting departure capsule and said departing capsule, wherein said expanding pocket of air is assisted by said respective pressure tank in order to accelerate said departing capsule.

20. The circulated pneumatic tube transit system as claimed in claim 14 comprises:

said first tube and said second tube being arranged on predetermined routes along electric power lines; and said first tube and said second tube being configured as a Faraday cage.

\* \* \* \* \*